United States Patent
Rusakov et al.

(10) Patent No.: US 12,265,417 B2
(45) Date of Patent: Apr. 1, 2025

(54) CONFIGURABLE CLOCK MACRO CIRCUITS AND METHODS

(71) Applicant: Intel Corporation, Santa Clara, CA (US)

(72) Inventors: Alexander Rusakov, Moscow (RU); Alexander Andreev, San Jose, CA (US); Eng Huat Lee, Bayan Lepas (MY); Andrei Nikishin, Moscow (RU)

(73) Assignee: Altera Corporation, San Jose, CA (US)

( * ) Notice: Subject to any disclaimer, the term of this patent is extended or adjusted under 35 U.S.C. 154(b) by 680 days.

(21) Appl. No.: 17/482,220

(22) Filed: Sep. 22, 2021

(65) Prior Publication Data

US 2022/0004221 A1    Jan. 6, 2022

(51) Int. Cl.
| | |
|---|---|
| *G06F 1/10* | (2006.01) |
| *G06F 30/327* | (2020.01) |
| *H01L 23/538* | (2006.01) |
| *H01L 27/02* | (2006.01) |
| *H03K 19/0185* | (2006.01) |

(52) U.S. Cl.
CPC .............. *G06F 1/10* (2013.01); *G06F 30/327* (2020.01); *H01L 23/5384* (2013.01); *H01L 27/0207* (2013.01); *H03K 19/018585* (2013.01)

(58) Field of Classification Search
CPC .................. G06F 1/10; H01L 23/5384; H03K 19/018585
See application file for complete search history.

(56) References Cited

U.S. PATENT DOCUMENTS

| | | | |
|---|---|---|---|
| 6,711,716 B1 * | 3/2004 | Mueller | G06F 1/10 326/38 |
| 7,564,260 B1 * | 7/2009 | Schmit | H03K 19/17744 326/38 |
| 7,622,952 B1 * | 11/2009 | Lim | H03K 19/1774 326/39 |
| 8,629,548 B1 * | 1/2014 | Andreev | H03K 19/0016 257/691 |
| 8,847,626 B1 * | 9/2014 | Chong | H03K 19/1737 326/38 |
| 9,024,657 B2 * | 5/2015 | Andreev | H03K 19/018585 326/38 |
| 10,069,486 B1 * | 9/2018 | Devlin | H03K 3/0372 |

(Continued)

FOREIGN PATENT DOCUMENTS

| | | | | |
|---|---|---|---|---|
| WO | WO-2014059168 A2 * | 4/2014 | | G06F 11/267 |
| WO | WO-2015197813 A1 * | 12/2015 | | G01R 31/3177 |

*Primary Examiner* — Seokjin Kim
(74) *Attorney, Agent, or Firm* — InventIQ Legal LLP; Steven J. Cahill (57) ABSTRACT

An integrated circuit includes a clock macro circuit. The clock macro circuit includes first, second, and third latch circuits and a multiplexer circuit. The first latch circuit is coupled to the second latch circuit. The multiplexer circuit is coupled to the second and third latch circuits. The clock macro circuit includes programmable vias that are programmed during fabrication of the integrated circuit to couple inputs of the clock macro circuit to the first latch circuit, the second latch circuit, the third latch circuit, and the multiplexer circuit. Programming the programmable vias causes the clock macro circuit to function as a selected type of clock circuit.

20 Claims, 9 Drawing Sheets

(56) References Cited

U.S. PATENT DOCUMENTS

| | | | |
|---|---|---|---|
| 2007/0033427 A1* | 2/2007 | Correale | G06F 1/10 |
| | | | 713/500 |
| 2009/0243652 A1* | 10/2009 | Dorairaj | G11C 7/1006 |
| | | | 326/38 |
| 2009/0278566 A1* | 11/2009 | Lewis | H03K 19/1733 |
| | | | 326/46 |
| 2016/0233852 A1* | 8/2016 | Ali | H03K 3/017 |
| 2016/0293541 A1* | 10/2016 | Andreev | H01L 23/5226 |
| 2018/0068050 A1* | 3/2018 | Lin | G06F 30/392 |
| 2022/0014182 A1* | 1/2022 | Lim | H01L 23/5226 |

\* cited by examiner

CONFIGURABLE CLOCK MACRO CIRCUITS AND METHODS

FIELD OF THE DISCLOSURE

The present disclosure relates to electronic circuits, and more particularly, to configurable clock macro circuits and methods.

BACKGROUND

A field programmable gate array (FPGA) is a type of integrated circuit (IC) that includes programmable interconnects and programmable logic blocks. The interconnects and logic blocks are programmable after fabrication in an FPGA. In an application specific integrated circuit (ASIC), the logic circuitry and interconnects typically have substantially less configurable features after fabrication than an FPGA. In general, an ASIC can implement a larger circuit design than an FPGA, because an ASIC is designed to use die area more efficiently, but ASIC design flow is often more expensive and complex than configuring an FPGA. A structured application specific integrated circuit (ASIC) has intermediate features between a standard ASIC and an FPGA. A structured ASIC may have the same basic logic structure as an FPGA, while being mask-programmable instead of field-programmable, by configuring vias between metal layers in the integrated circuit. Each configuration bit in an FPGA can be replaced in a structured ASIC by either placing or not placing a via between metal contacts.

DETAILED DESCRIPTION

Most of the masks that are used to manufacture structured ASIC devices during the photolithographic process are manufactured once per device and do not depend on a user design for the structured ASIC. A structured ASIC device may be custom made to implement a user design by changing metal masks or via masks that are used to manufacture the device. In structured ASIC technology, the clock structure defines the efficiency of the technology and the maximum frequency of user designs that are mapped onto the structured ASIC devices. The clock structure in a structured ASIC may include clock circuits, such as clock shapers, clock multiplexers, clock gates, clock buffers, and design-for-test (DFT) circuits.

Having dedicated clock circuits in a structured ASIC for clock multiplexers, clock shapers, and clock buffers affects efficient device resource usage. On complex high-speed user designs for structured ASICs, there may be local resource deficits of some types of clock circuits even if the physical sites of other types of clock circuits are not used in the device, which may lead to a suboptimal clock structure. The lack of integrated DFT functionality at clock tree exit points complicates applying an engineering change order (ECO) to a user design. A user of a physical synthesis tool (for placement) may have to return to the register-transfer level (RTL) analysis of the design, modify the RTL netlist, and/or split clock gated domains for positive and negative edge triggered register cells. These additional steps increase design closure time.

According to some embodiments disclosed herein, a configurable clock macro circuit can be configured using programmable masks in a structured ASIC device to perform a variety of different functions that are used for clock signals. The clock macro circuit can be configured using a set of vias into a clock circuit having functionalities such as a clock buffer, a clock inverter, a clock gate, a clock multiplexer, and/or a clock shaper. The clock macro circuit may, for example, be used as a clock network entry point. A clock network distributes one or more clock signals over the structured ASIC device to leaves of the clock network. The clock macro circuit may also be configured as a clock network exit point with corresponding gating, buffer, and/or inverting functions. In some embodiments, the clock macro circuit can be configured as a clock inverter that inverts a clock signal for negative edge triggered sequential circuits in the structured ASIC device.

In some embodiments, several instances of the clock macro circuit can be provided in a structured ASIC device. The clock macro circuits can be configured to perform a wide variety of logical clock functions at physical sites of the structured ASIC device, providing more efficient resource usage on the device. The clock macro circuits can be configured to perform different clock functions without considerable impact on the physical implementation of a clock network coupled to the clock macro circuits. The clock macro circuits may obviate the need to instantiate negative edge clock gate circuits in an RTL netlist. The clock macro circuits can also provide a larger space for optimization of the positions of clock network entry points, which can allow for the design of a more efficient clock structure in the clock network (e.g., clock tree) and allow for a higher clock frequency to be achieved.

In some embodiments, the clock macro circuit is a generic clock shaper circuit that is programmable, for example, with 2 via masks in a fabric region of the device to perform a variety of clock functions. A structured ASIC device may have several pre-instantiated instances of the unconfigured clock macro circuits in selected sites in the device. These selected sites are distributed over special regions of the device (referred to as super-motifs). Every super-motif may, for example, contain approximately one hundred sites that are available to place instances of the clock macro circuit. Configuration (or programming) of each clock macro circuit can be performed by mapping a clock instance function in a user design for the device onto the corresponding clock macro circuit at a site in the device and setting vias to match the clock macro functions as required by the user design. Unused clock macro sites in the device are configured into special off variants of the clock macro circuit that have a small power leakage. The sites of some of the clock macro circuits in the device may, for example, be simultaneously used by clock entry points and clock exit points for a clock network.

Figure 1:
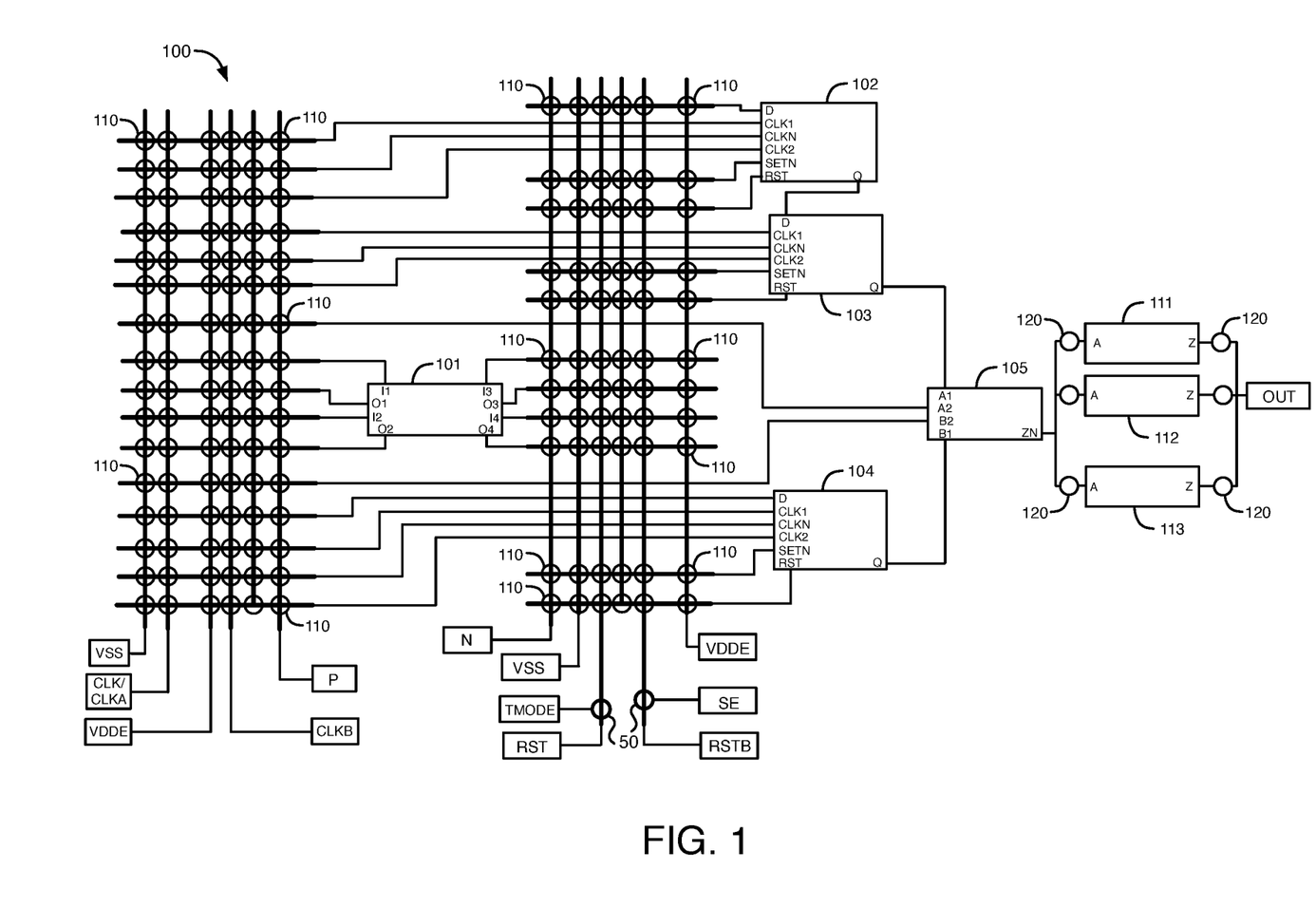
FIG. 1 illustrates an example of a configurable clock macro circuit, according to an embodiment.

FIG. 1 illustrates an example of a configurable clock macro circuit 100, according to an embodiment. Clock macro circuit 100 may, for example, be formed in a structured ASIC device or in another type of ASIC, such as a microprocessor or graphics processing unit. The clock macro circuit 100 of Figure (FIG. 1 includes a clock inversion circuit 101, 3 latch circuits 102-104, multiplexer circuit 105, and 3 inverter circuits 111-113. In clock macro circuit 100, the Q output of latch 102 is coupled to the D input of latch circuit 103, and latch circuits 102-103 may function as a flip-flop circuit. The clock macro circuit 100 may receive various input signals, including a low voltage VSS that is used as a ground voltage or as a logical 0 signal, periodic clock signals CLK/CLKA and CLKB, a voltage VDDE that is used as a supply voltage or as a logical 1 signal, a positive input signal P, a negative input signal N, a test mode enable/disable signal TMODE, a reset signal RST, an inverted reset signal RSTB, and a scan enable signal SE. These input signals may, for example, be provided from external terminals of the ASIC (such as pins or pads), from internal terminals of the ASIC, or from any combination thereof.

Clock macro circuit 100 includes horizontal and vertical conductors (i.e., wires) that couple circuits 101-105 and 111-113 to each other, to other circuits, and to the inputs and outputs of circuit 100. In FIG. 1, the horizontal wires shown as wide black horizontal lines in FIG. 1 are in a first metal layer N in the ASIC, and the vertical wires shown as wide black vertical lines in FIG. 1 are in a second metal layer N+1 in the ASIC. The first metal layer N and the second metal layer N+1 are consecutive (i.e., adjacent) metal layers in the ASIC die. Clock macro circuit 100 includes 162 programmable vias 110 arranged in 12 columns. Programmable vias 110 are positioned between the first metal layer N and the second metal layer N+1. Clock macro circuit 100 also includes 2 programmable vias 50 that are positioned between the second metal layer N+1 and a third metal layer N+2 in the ASIC. Clock macro circuit 100 also includes 6 programmable vias 120 next to circuits 111-113. Vias 120 are also between 2 metal layers. The vias 50, 110, and 120 are shown as circles in FIG. 1.

The inputs that receive the input signals shown in FIG. 1 may, for example, be in metal layer N. The inputs that receive the design-for-test (DFT) test mode TMODE and scan enable SE signals can be coupled to the inputs that receive signals RST and RSTB through programmable vias 50 and to intrinsic vertical wires on the metal layer N+2. Thus, the test mode inputs do not require additional wires on metal layer N+1 and do not increase the layout area of clock macro circuit 100.

The programmable vias 110 and 50 can be selectively programmed using one or more via masks during fabrication of the ASIC to couple any selected set of the inputs that provide signals VSS, CLK/CLKA, CLKB, VDDE, P, N, TMODE, RST, RSTB, and/or SE to circuits 101-105 and/or to couple selected outputs of circuit 101 to circuits 102-105. The 6 programmable vias 120 can be selectively programmed using one or more via masks during fabrication of the ASIC to couple the output ZN of multiplexer circuit 105 to one or more of inverter circuits 111-113, and to couple the outputs of one or more of inverter circuits 111-113 to output OUT. Each of the programmable vias 110, 120, and 50 can be made to be conductive or non-conductive during fabrication of the ASIC using one or more via masks to cause the programmable via to couple or de-couple wires in two metal layers. Clock macro circuit 100 can be configured to have a desired clock function, such as a clock buffer, a clock inverter, a clock gate, a clock multiplexer, or a clock shaper, by programming selected sets of the programmable vias 110, 120, and 50 in this manner.

Figure 2:
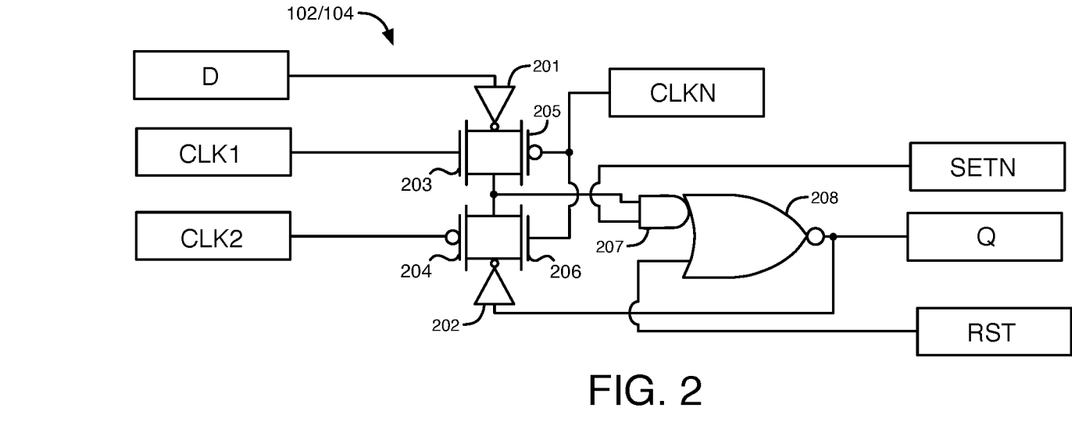
FIG. 2 illustrates an example of a latch circuit in the clock macro circuit of FIG. 1, according to an embodiment.

FIG. 2 illustrates an example of each of the latch circuits 102 and 104 of clock macro circuit 100 of FIG. 1, according to an embodiment. In the embodiment of FIG. 2, latch circuit 102/104 includes inverter circuits 201-202, n-channel metal oxide semiconductor (MOS) field-effect transistors (FETs) 203 and 206, p-channel MOS field-effect transistors 204-205, AND logic gate circuit 207, and NOR logic gate circuit 208. Transistors 203 and 205 are coupled as a first pass gate circuit, and transistors 204 and 206 are coupled as a second pass gate circuit. The D input of latch 102/104 is coupled to an input of inverter circuit 201. The CLK1 input of latch 102/104 is coupled to the gate of transistor 203. The CLK2 input of latch 102/104 is coupled to the gate of transistor 204. The CLKN input of latch 102/104 is coupled to the gates of transistors 205-206. In the examples of FIGS. 6-7, 9, and 11 described below, the CLK input of each latch 102/104 is coupled to the CLKN input of the latch 102/104 shown in FIG. 2 through an inverter circuit (e.g., in inversion circuit 101), and the CLK input of each latch 102/104 is coupled to the CLK1 and CLK2 inputs of the latch 102/104 shown in FIG. 2. The SETN input of latch 102/104 is coupled to a first input of AND gate circuit 207. The output of NOR gate circuit 208 is coupled to the Q output of latch 102/104 and to an input of inverter circuit 202. The output of AND gate circuit 207 is coupled to a first input of NOR gate circuit 208. The RST input of latch 102/104 is coupled to the second input of NOR gate circuit 208. When one of the transistors 203 or 205 is on, the inversion of the signal at the D input is provided from inverter circuit 201 to the second input of AND gate circuit 207. When one of the transistors 204 or 206 is on, the inversion of the output signal of NOR gate circuit 208 is provided from inverter circuit 202 to the second input of AND gate circuit 207.

Figure 3:
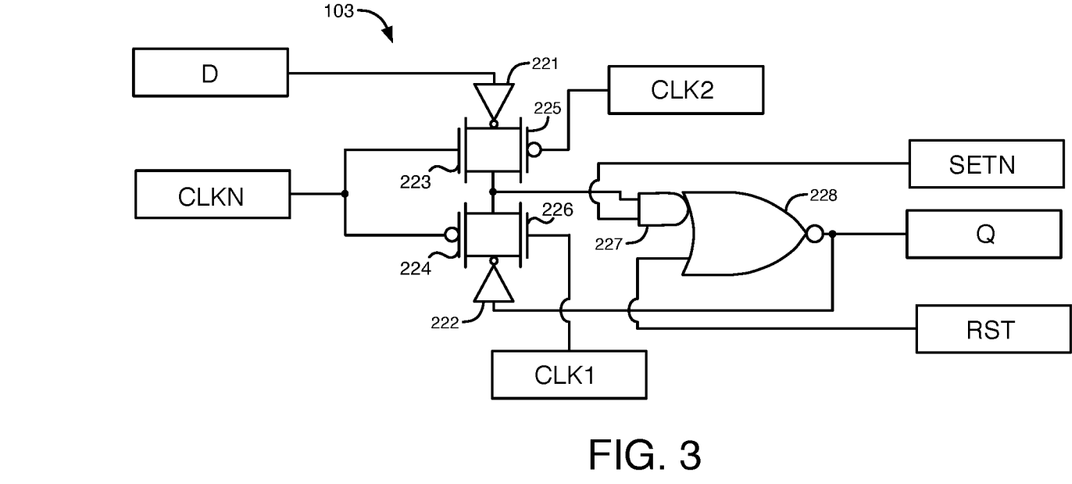
FIG. 3 illustrates another example of a latch circuit in the clock macro circuit of FIG. 1, according to an embodiment.

FIG. 3 illustrates an example of the latch circuit 103 of clock macro circuit 100, according to an embodiment. In the embodiment of FIG. 3, latch circuit 103 includes inverter circuits 221-222, n-channel MOS field-effect transistors 223 and 226, p-channel MOS field-effect transistors 224-225, AND logic gate circuit 227, and NOR logic gate circuit 228. Transistors 223 and 225 are coupled as a first pass gate circuit, and transistors 224 and 226 are coupled as a second pass gate circuit. The D input of the latch 103 is coupled to an input of inverter circuit 221. The CLK1 input of the latch 103 is coupled to the gate of transistor 226. The CLK2 input of the latch 103 is coupled to the gate of transistor 225. The CLKN input of the latch 103 is coupled to the gates of transistors 223-224. In the examples of FIGS. 6-7, 9, and 11 described below, the CLK input of each latch 103 is coupled to the CLKN input of the latch 103 shown in FIG. 3 through an inverter circuit (e.g., in inversion circuit 101), and the CLK input of each latch 103 is coupled to the CLK1 and CLK2 inputs of the latch 103 shown in FIG. 3. The SETN input of latch 103 is coupled to a first input of AND gate circuit 227. The output of NOR gate circuit 228 is coupled to the Q output of latch 103 and to an input of inverter circuit 222. The output of AND gate circuit 227 is coupled to a first input of NOR gate circuit 228. The RST input of latch 103 is coupled to the second input of NOR gate circuit 228. When one of the transistors 223 or 225 is on, the inversion of the signal at the D input is provided from inverter circuit 221 to the second input of AND gate circuit 227. When one of the transistors 224 or 226 is on, the inversion of the output signal of NOR gate circuit 228 is provided from inverter circuit 222 to the second input of AND gate circuit 227.

Figure 4:
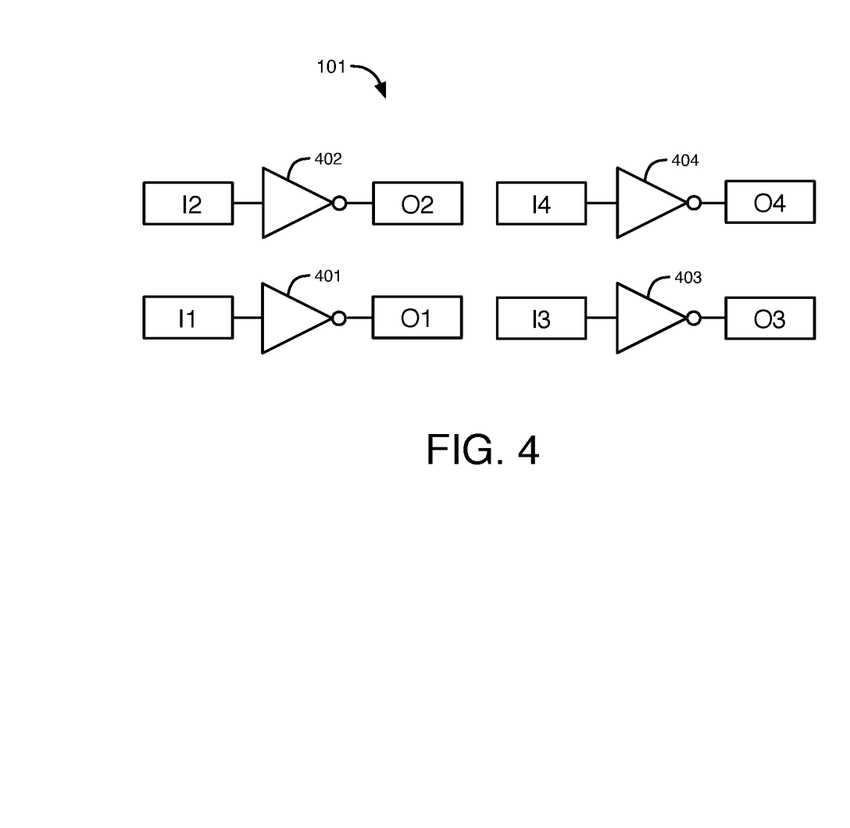
FIG. 4 illustrates an example of the clock inversion circuit in the clock macro circuit of FIG. 1, according to an embodiment.

FIG. 4 illustrates an example of the clock inversion circuit 101 in the clock macro circuit 100 of FIG. 1, according to an embodiment. In the embodiment of FIG. 4, clock inversion circuit 101 includes 4 inverter circuits 401-404. Inverter circuit 401 is coupled between the I1 input and the O1 output of clock inversion circuit 101. Inverter circuit 402 is coupled between the I2 input and the O2 output of clock inversion circuit 101. Inverter circuit 403 is coupled between the I3 input and the O3 output of clock inversion circuit 101. Inverter circuit 404 is coupled between the I4 input and the O4 output of clock inversion circuit 101.

Figure 5:
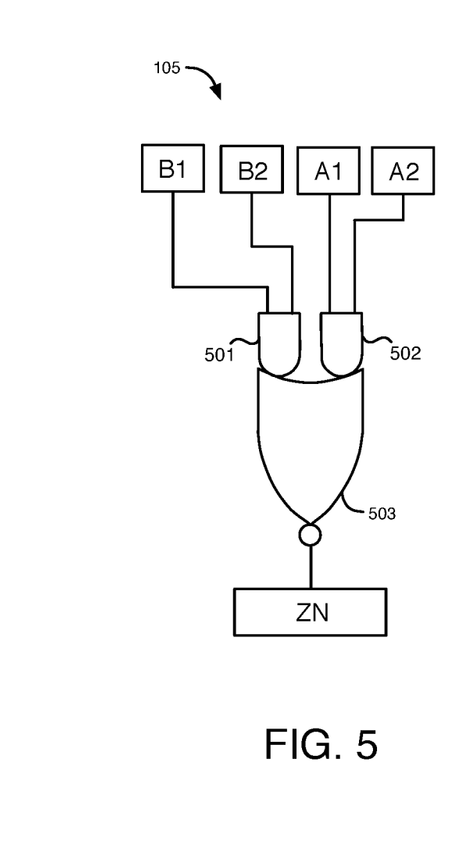
FIG. 5 illustrates an example of the multiplexer circuit in the clock macro circuit of FIG. 1, according to an embodiment.

FIG. 5 illustrates an example of the multiplexer circuit 105 in the clock macro circuit 100 of FIG. 1, according to an embodiment. In the embodiment of FIG. 5, multiplexer circuit 105 includes AND logic gate circuits 501-502 and NOR logic gate circuit 503. The inputs of AND logic gate circuit 501 are coupled to the B1 and B2 inputs of multiplexer circuit 105. The inputs of AND logic gate circuit 502 are coupled to the A1 and A2 inputs of multiplexer circuit 105. The outputs of AND logic gate circuits 501 and 502 are coupled to the inputs of NOR logic gate circuit 503. The output of NOR logic gate circuit 503 is coupled to the ZN output of multiplexer circuit 105.

Figure 6:
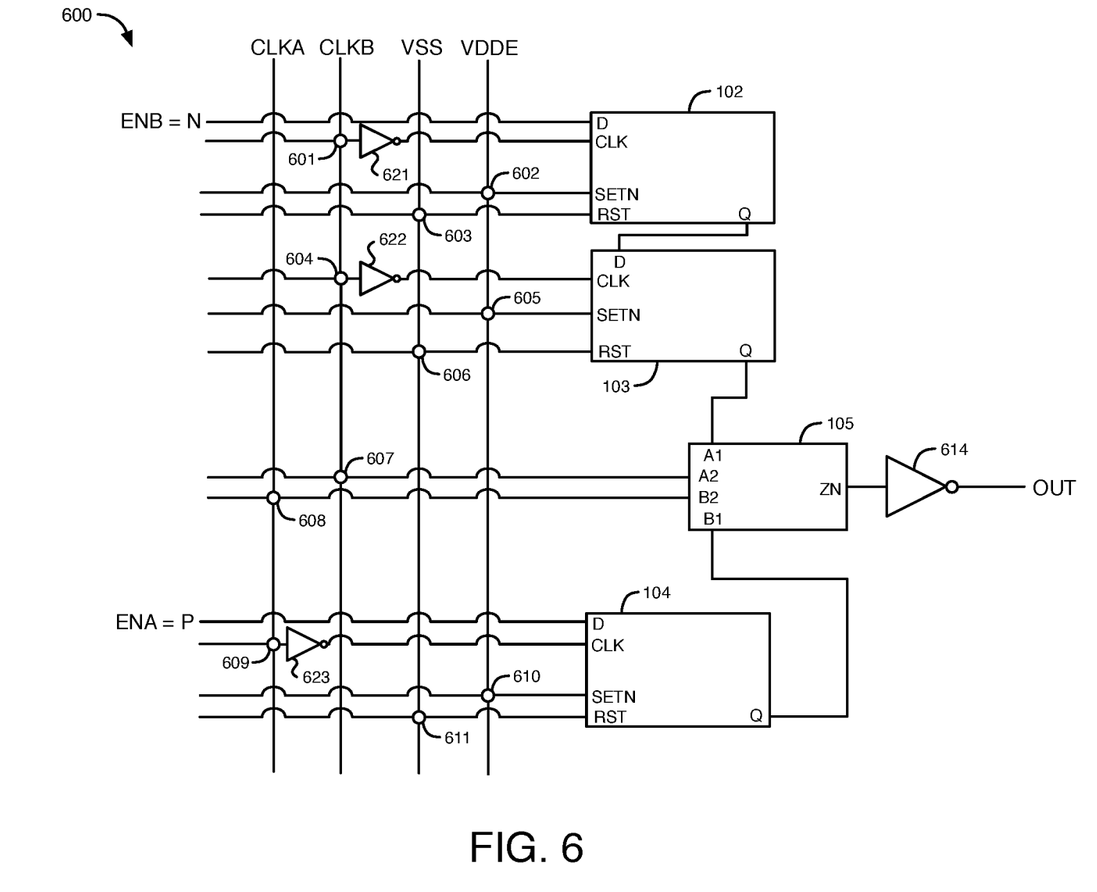
FIG. 6 illustrates an example of the clock macro circuit of FIG. 1 configured as a clock multiplexer circuit, according to an embodiment.

FIG. 6 illustrates an example of the clock macro circuit 100 of FIG. 1 configured as a clock multiplexer circuit 600, according to an embodiment. Clock macro circuit 100 may be configured to implement the clock multiplexer circuit 600 of FIG. 6, for example, by programming one or more via masks during fabrication of the ASIC containing clock macro circuit 100. In clock multiplexer circuit 600, inverter circuits 621-623 may be, for example, inverter circuits 401-402 in clock inversion circuit 101. Clock multiplexer circuit 600 receives input signals CLKA, CLKB, VSS, and VDDE from the corresponding inputs shown in FIG. 1. Input signals ENA and ENB are provided to clock multiplexer circuit 600 from inputs P and N, respectively. Vias 601-611 are a subset of the programmable vias 110 that have been filled with conductive material during fabrication of the ASIC to couple wires in the first metal layer N to corresponding wires in the second metal layer N+1 to create the connections between the inputs providing signals CLKA, CLKB, VSS, ENA, ENB, and VDDE and circuits 102-105 and 621-623 shown in FIG. 6.

In clock multiplexer circuit 600, inverter circuits 621-622 receive clock signal CLKB through vias 601 and 604 and provide inverted versions of clock signal CLKB to CLK inputs of latch circuits 102 and 103, respectively. Low voltage VSS is provided to the reset RST inputs of latch circuits 102, 103, and 104 through vias 603, 606, and 611, respectively. Voltage VDDE is provided to the SETN inputs of latch circuits 102, 103, and 104 through vias 602, 605, and 610, respectively. Clock signal CLKB is provided to the A2 input of multiplexer circuit 105 through via 607. Clock signal CLKA is provided to the B2 input of multiplexer circuit 105 through via 608. Inverter circuit 623 receives clock signal CLKA through via 609 and provides an inverted version of clock signal CLKA to the CLK input of latch circuit 104. Inverter circuit 614 in clock multiplexer circuit 600 is one of inverter circuits 111-113 that is coupled to multiplexer circuit 105 and output OUT through a selected pair of vias 120 that have been filled with conductive material during fabrication of the ASIC.

Latch circuits 102-103 provide the value of input signal ENB from the D input of latch circuit 102 to the A1 input of multiplexer circuit 105 in response to the inverted clock signal CLKB. Latch circuit 104 provides the value of input signal ENA to the B1 input of multiplexer circuit 105 in response to the inverted clock signal CLKA. AND gate circuit 501 in multiplexer circuit 105 performs a logic AND function on clock signal CLKA and signal ENA. AND gate circuit 502 in multiplexer circuit 105 performs a logic AND function on clock signal CLKB and input signal ENB. NOR gate circuit 503 in multiplexer circuit 105 and inverter circuit 614 perform a logical OR function on the output signals of the AND gate circuits 501 and 502 to generate the output signal of the clock multiplexer circuit 600 at OUT. The logic functions performed by clock multiplexer circuit 600 can be expressed as OUT=(ENA & CLKA)|(ENB & CLKB).

Figure 7:
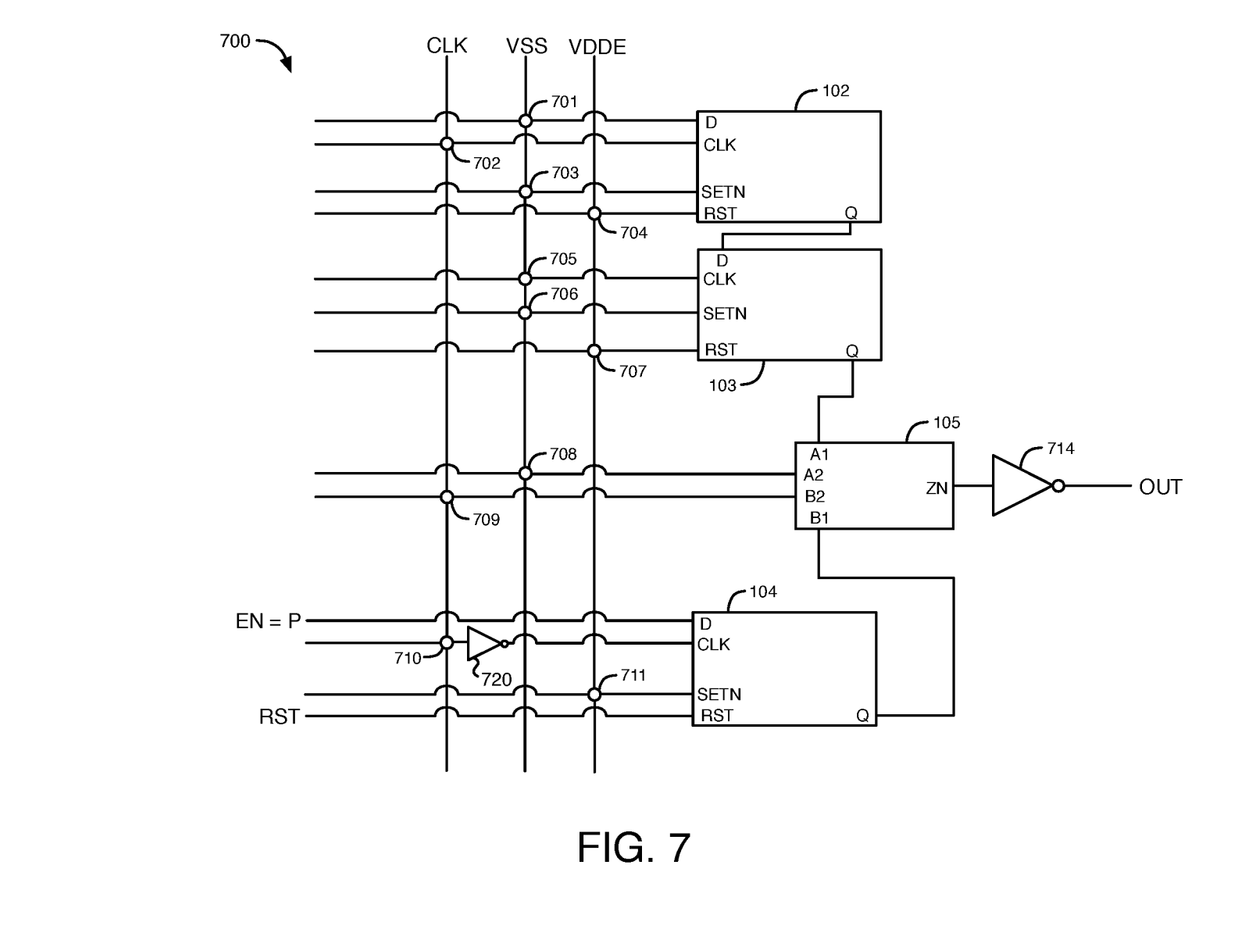
FIG. 7 illustrates an example of the clock macro circuit of FIG. 1 configured as a clock gate circuit, according to an embodiment.

FIG. 7 illustrates an example of the clock macro circuit 100 of FIG. 1 configured as a clock gate circuit 700, according to an embodiment. Clock macro circuit 100 may be configured to implement the clock gate circuit 700 of FIG. 7 using, for example, one or more via masks during fabrication of the ASIC containing clock macro circuit 100. In clock gate circuit 700, inverter circuit 720 may be one of the inverter circuits 401-402 in clock inversion circuit 101. Clock gate circuit 700 receives input signals EN, CLK, VSS, RST, and VDDE from the corresponding inputs shown in FIG. 1. Input signal EN is provided to clock gate circuit 700 from input P. Vias 701-711 are a subset of the programmable vias 110 that have been filled with conductive material during fabrication of the ASIC to couple wires in the first metal layer N to corresponding wires in the second metal layer N+1 to create the connections between the inputs providing signals CLK, VSS, EN, RST, and VDDE and circuits 102-105 and 720 shown in FIG. 7. The reset signal RST is also provided through one of vias 50.

In clock gate circuit 700, clock signal CLK is provided to the CLK input of latch circuit 102 through via 702 and to the B2 input of multiplexer circuit 105 through via 709. Inverter circuit 720 receives clock signal CLK through via 710 and provides an inverted version of clock signal CLK to the CLK input of latch circuit 104. Voltage VSS is provided to the D and SETN inputs of latch circuit 102 through vias 701 and 703, respectively. Voltage VSS is provided to the CLK and SETN inputs of latch circuit 103 through vias 705 and 706, respectively. Voltage VSS is provided to the A2 input of multiplexer circuit 105 through via 708. Voltage VDDE is provided to the RST inputs of latch circuits 102 and 103 through vias 704 and 707, respectively, and to the SETN input of latch circuit 104 through via 711. The RST signal is provided to the RST input of latch circuit 104. The EN signal is provided to the D input of latch circuit 104.

The voltage VDDE keeps latch circuits 102-103 in reset and causes the Q output of latch circuit 103 to remain low, causing the output of AND gate circuit 502 in multiplexer circuit 105 to remain low. Latch circuit 104 provides the value of input signal EN to the B1 input of multiplexer circuit 105 in response to the inverted version of clock signal CLK. AND gate circuit 501 in multiplexer circuit 105 performs a logic AND function on clock signal CLK at its B2 input and the value of signal EN received at its B1 input. NOR gate circuit 503 in multiplexer circuit 105 and inverter circuit 714 perform a logical OR function on the output signals of the AND gate circuits 501 and 502 to generate the output signal of the clock gate circuit 700 at OUT. The logic functions performed by clock gate circuit 700 can be expressed as OUT=(EN & CLK) & !RST, where !RST is the logical inversion of signal RST. Inverter circuit 714 in clock gate circuit 700 is one of inverter circuits 111-113 that is coupled to multiplexer circuit 105 and output OUT through a selected pair of vias 120 that have been filled with conductive material during fabrication of the ASIC.

In many structured ASIC devices, it is not efficient to have negative clock edge triggered flip-flops and memories. In some embodiments, a special modeling of negative clock edge triggered circuits may be used that is transparent for an RTL developer, that does not introduce new RTL design rules, and that satisfies DFT requirements.

According to some embodiments disclosed herein, the clock macro circuit 100 of FIG. 1 can be configured to implement a negative clock edge circuit on an ASIC device, such as a structured ASIC. In a structured ASIC device, a single global clock network may be built for each clock signal that is transmitted in the device to clock sinks (i.e., clocked circuits receiving positive and/or negative edges of the clock signal). A local clock macro circuit 100 may be inserted on the clock path at each of the clock sinks in a clock network where a clock signal exits the clock network. The local clock macro circuit 100 can be configured either as a clock buffer circuit or as a clock gate circuit, depending on the user's requirements. The positive edge triggered clocked circuits (e.g., flip-flops, random access memory macros, etc.) are driven by the local clock macro circuit 100 with a small clock network (e.g., a clock tree) of buffer circuits that distribute the clock signal over a small region of the ASIC device. For the negative edge triggered clocked circuits, a clock macro circuit 100 configured as a clock buffer circuit that generates an inverted output is instantiated in the clock network after one or more of the corresponding local clock macro circuits 100. Further details of these embodiments are disclosed herein with respect to FIGS. 8-10B.

Figure 8:
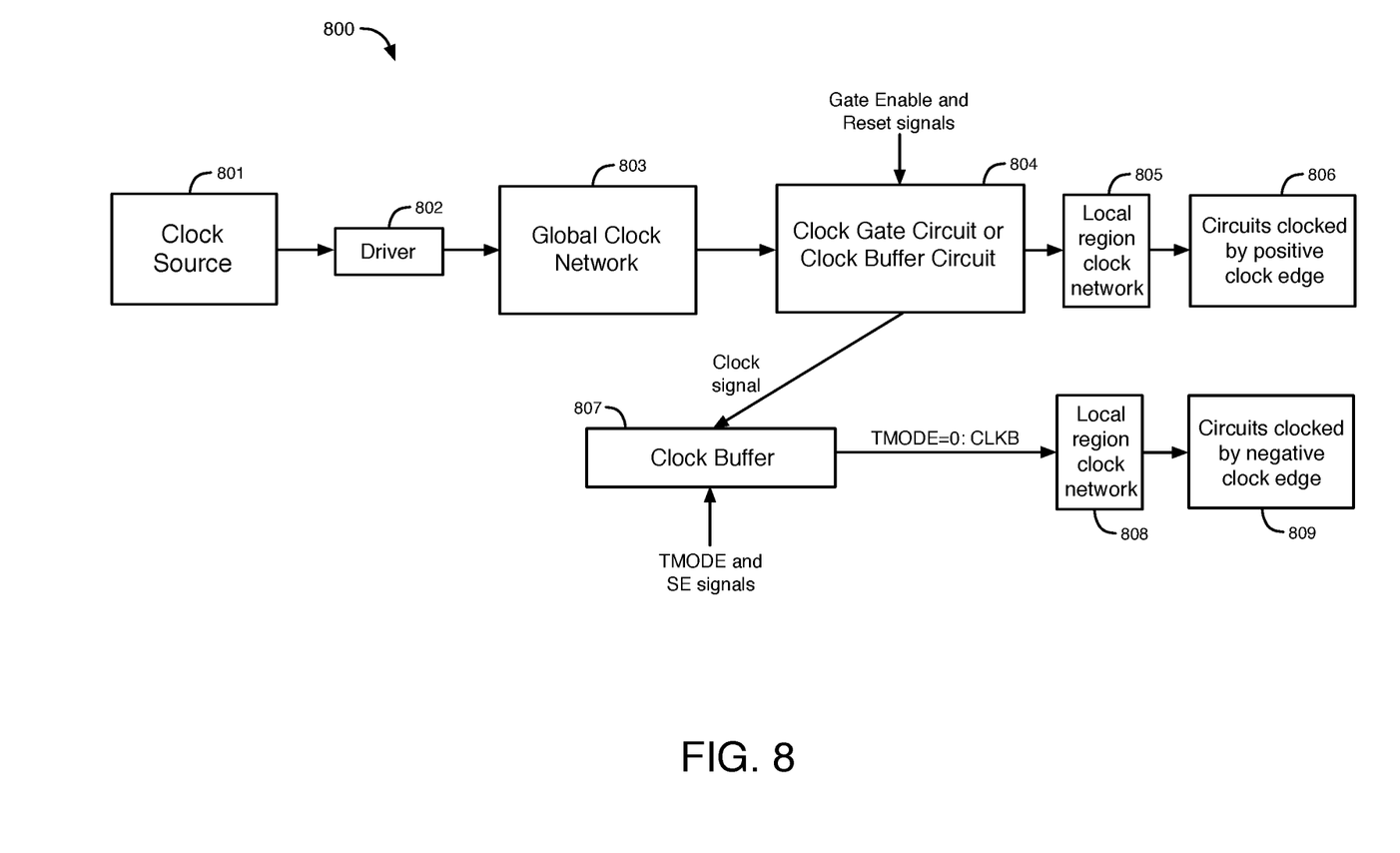
FIG. 8 is a block diagram of an exemplary clock network in an integrated circuit (IC) that is configured to provide a clock signal to circuits in the IC that are clocked by positive and negative edges of the clock signal, according to an embodiment.

FIG. 8 is a block diagram of an exemplary clock network 800 in an integrated circuit (IC) that is configured to provide a clock signal to circuits in the IC that are clocked by positive and negative edges of the clock signal, according to an embodiment. The clock network of FIG. 8 may, for example, be formed in an ASIC, such as a structured ASIC. As shown in FIG. 8, a clock source 801 provides a clock signal to a driver circuit 802. The clock source 801 may, for example, include circuitry that generates a clock signal, such as a phase-locked loop or a delay-locked loop, or may include an external terminal of the IC and a receiver circuit that provides the clock signal from a source outside the IC. Driver circuit 802 may be, for example, an instantiation of the clock macro circuit 100 of FIG. 1 configured as a clock driver circuit. Driver circuit 802 drives the clock signal to a global clock network 803 (e.g., a clock H-tree) in the IC. The global clock network 803 has conductors (wires) that are coupled to transmit the clock signal throughout the IC.

Global clock network 803 provides the clock signal from the driver circuit 802 to several leaf nodes (i.e., endpoints) of the clock network 803 that are located throughout the IC. A clock gate or buffer circuit 804 is located at each of the leaf nodes of the global clock network 803. Only one of these clock gate/buffer circuits 804 is shown in FIG. 8 to simplify the drawing. The clock gate and/or buffer circuits 804 may be, for example, instances of clock macro circuit 100 of FIG. 1 that are configured during the fabrication of the IC as clock gate circuits and/or clock buffer circuits. One or more of the clock gate/buffer circuits 804 may receive gate enable and/or reset signals as inputs. The clock gate/buffer circuits 804 in the IC provide the clock signal from global clock network 803 to local region clock networks 805. Each of the local region clock networks 805 is a local clock network (e.g., a clock tree) that provides the clock signal to one or more circuits 806 that are clocked by positive edges (e.g., rising edges) of the clock signal.

One, a subset of, or all of the clock gate/buffer circuits 804 in the IC provide the clock signal from global clock network 803 to one or more clock buffer circuits 807 that generate inverted outputs. The IC may, for example, have a clock buffer circuit 807 at one of the leaf modes (or clock sinks) of clock network 803, at each of a subset of the leaf nodes of clock network 803, or at each of the leaf nodes of clock network 803. The clock buffer circuits 807 may be, for example, instances of the clock macro circuit 100 of FIG. 1 that are configured during the fabrication of the IC as clock buffer circuits that generate inverted outputs, as described below.

Each of the clock buffer circuits 807 receives test mode TMODE and scan enable SE signals as inputs. The function of each instance of the clock buffer circuit 807 in the IC depends on the logic state of the test mode signal TMODE that is distributed over the IC device. In response to an instance of the clock buffer circuit 807 receiving a logic high state (i.e., 1) in the test mode signal TMODE, the output signal of that instance of the clock buffer circuit 807 depends on the logic state of the scan enable SE signal received at that instance of the clock buffer circuit 807. In response to an instance of the clock buffer circuit 807 receiving a logic low state (i.e., 0) in the test mode signal TMODE, that instance of the clock buffer circuit 807 functions as a combinational clock inverter circuit in a user mode that inverts the clock signal received from circuit 804 to generate an inverted clock signal CLKB that is provided to a local region clock network 808 (e.g., a clock tree). Thus, each clock buffer circuit 807 is configured as a combinational clock inverter circuit in response to the TMODE signal being equal to 0. Each of the local region clock networks 808 provides the inverted clock signal CLKB received from the local instance of clock buffer circuit 807 to one or more circuits 809 that are clocked by negative edges (e.g., falling edges) of the clock signal.

Providing numerous instances of clock macro circuit 100 throughout an IC allows a placement tool to place instances of the clock buffer circuit 807 very close to the corresponding instances of the clock gate/buffer circuits 804 in clock network 800, which reduces clock skew in the clock signal provided through clock network 800. After each instance of clock buffer circuit 807 is placed on the path to the circuits 809 clocked by the negative clock edges, a standard design for test (DFT) insertion procedure may be performed that adds controls on the clock signal at the clock network root independently of the polarity of the clock signal at the clock sinks. Clock network 800 can support DFT requirements for circuits that are clocked by negative edges of a clock signal in an IC device, without requiring modifications to the RTL netlist for the IC.

Figure 9:
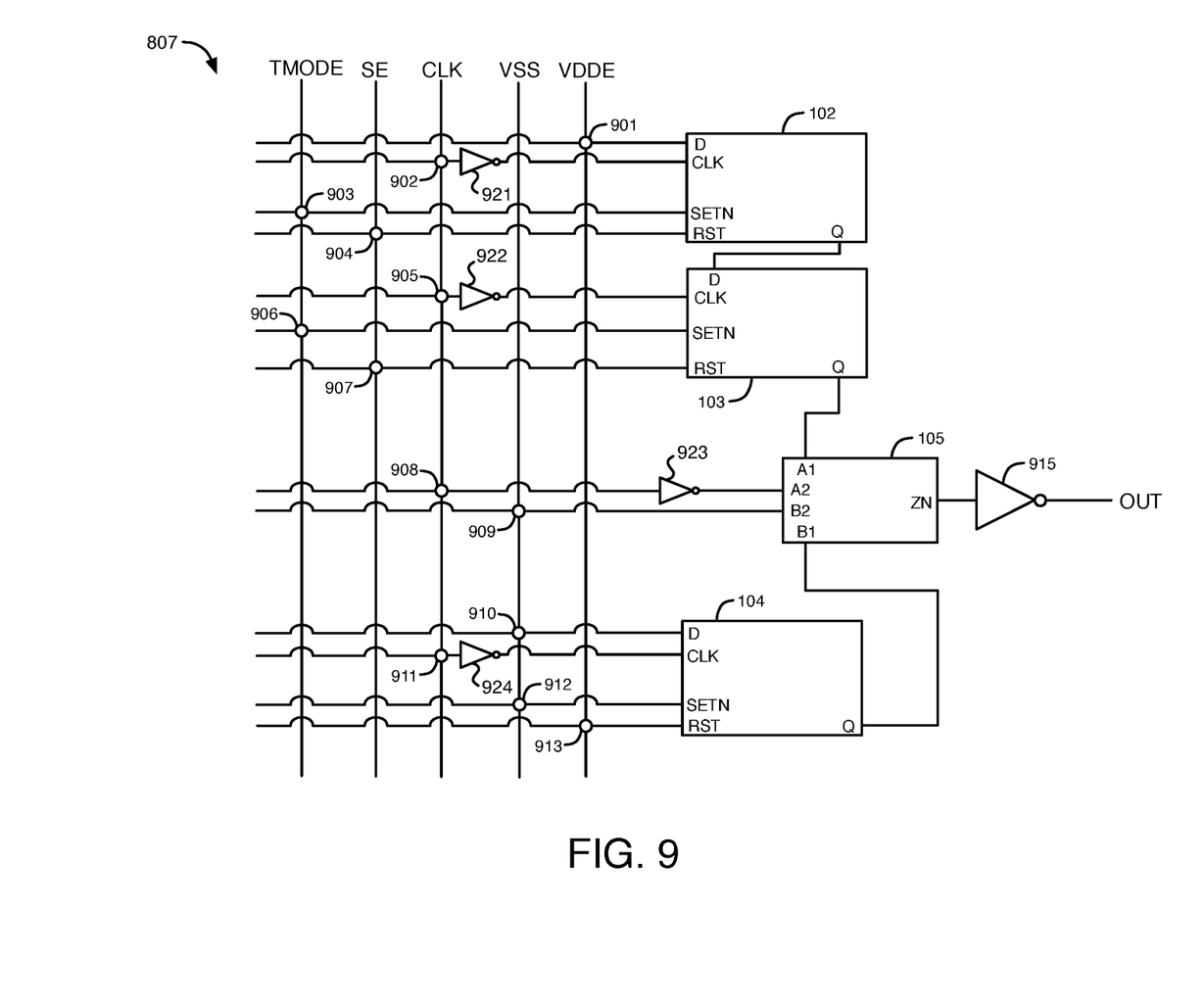
FIG. 9 illustrates an example of the clock macro circuit of FIG. 1 configured as the inverting clock buffer circuit of FIG. 8, according to an embodiment.

FIG. 9 illustrates details of an example of the clock macro circuit 100 of FIG. 1 configured as the clock buffer circuit 807 of FIG. 8, according to an embodiment. Clock macro circuit 100 may be configured to implement the clock buffer circuit 807 of FIGS. 8-9 using, for example, one or more via masks during fabrication of the ASIC containing clock macro circuit 100. In clock buffer circuit 807, inverter circuits 921-924 may be inverter circuits 401-402 in clock inversion circuit 101, shown in FIG. 4.

Clock buffer circuit 807 receives input signals TMODE, SE, CLK, VSS, and VDDE from the corresponding inputs shown in FIG. 1. Vias 901-913 are a subset of the programmable vias 50 and 110 that have been filled with conductive material during fabrication of the ASIC using via masks to couple together wires in different conductive layers to create the connections between the inputs providing signals TMODE, SE, CLK, VSS, and VDDE and circuits 102-105 and 921-924 shown in FIG. 9.

In clock buffer circuit 807, inverter circuits 921, 922, and 924 receive the clock signal CLK through vias 902, 905, and 911 and provide inverted versions of the clock signal CLK to the CLK inputs of latch circuits 102, 103, and 104, respectively. Inverter circuit 923 receives the clock signal CLK through via 908 and provides an inverted version of the clock signal CLK to the A2 input of multiplexer circuit 105. The test mode signal TMODE is provided through vias 903 and 906 to the SETN inputs of latch circuits 102 and 103, respectively. The scan enable signal SE is provided through vias 904 and 907 to the RST inputs of latch circuits 102 and 103, respectively. Voltage VSS is provided through vias 909, 910, and 912 to the B2 input of multiplexer circuit 105, to the D input of latch 104, and to the SETN input of latch 104, respectively. Voltage VDDE is provided through vias 901 and 913 to the D and RST inputs of latch circuits 102 and 104, respectively. Inverter circuit 915 inverts the output signal of multiplexer circuit 105 to generate the output signal of clock buffer circuit 807 at output OUT. Inverter circuit 915 is one of inverter circuits 111-113 that is coupled to multiplexer circuit 105 and output OUT through a selected pair of vias 120 that have been filled with conductive material during fabrication of the ASIC.

Figure 10A:
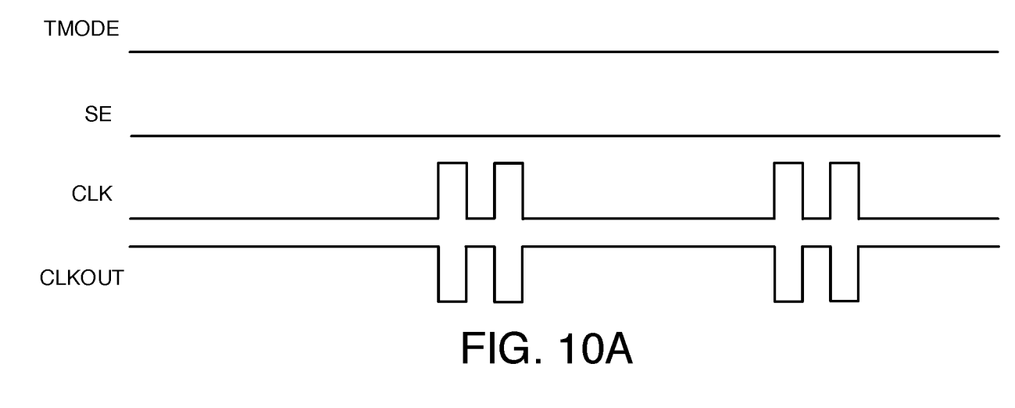
FIG. 10A is a timing diagram that illustrates the operation of the inverting clock buffer circuit of FIG. 9 in response to the test mode signal TMODE being in a logic low state, according to an embodiment.

FIG. 10A is a timing diagram that illustrates the operation of the clock buffer circuit 807 of FIG. 9 in response to the test mode signal TMODE being in a logic low state (i.e., 0), according to an embodiment. FIG. 10A illustrates examples of the waveforms of the test mode signal TMODE, the scan enable signal SE, the input clock signal CLK, and the output clock signal CLKOUT at output OUT of the clock buffer circuit 807 of FIG. 9 when the TMODE signal is in a logic low state. As discussed above with respect to FIG. 8, clock buffer circuit 807 functions as a combinational inverter circuit that inverts the input clock signal CLK to generate an inverted clock signal CLKOUT at output OUT in response to receiving a logic low state in test mode signal TMODE. As shown in FIG. 10A, the output clock signal CLKOUT at output OUT of clock buffer circuit 807 is the logical inverse of the input clock signal CLK received at input CLK when the test mode signal TMODE is in a logic low state. The scan enable signal SE is also in a logic low state in the embodiment of FIG. 10A.

Figure 10B:
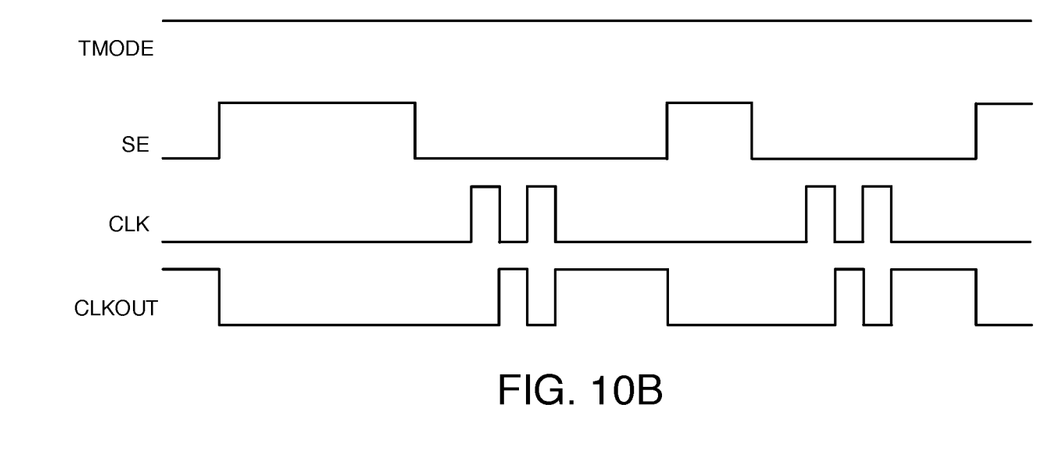
FIG. 10B is a timing diagram that illustrates the operation of the inverting clock buffer circuit of FIG. 9 in response to the test mode signal TMODE being in a logic high state, according to an embodiment.

FIG. 10B is a timing diagram that illustrates the operation of the clock buffer circuit 807 of FIG. 9 in response to the test mode signal TMODE being in a logic high state (i.e., 1), according to an embodiment. FIG. 10B illustrates examples of the waveforms of the test mode signal TMODE, the scan enable signal SE, the input clock signal CLK at input CLK, and the output clock signal CLKOUT at output OUT in the clock buffer circuit 807 of FIG. 9 when the TMODE signal is in a logic high state. In response to the scan enable signal SE being in a logic high state and the input clock signal CLK being in a logic low state, latch circuits 102-103 are in reset, and the output signal CLKOUT is in a logic low state, as shown in FIG. 10B. In response to the scan enable signal SE being in a logic low state, the clock buffer circuit 807 causes the output clock signal CLKOUT to be the logical inverse of the input clock signal CLK after the first rising edge in clock signal CLK, as shown in FIG. 10B.

Figure 11:
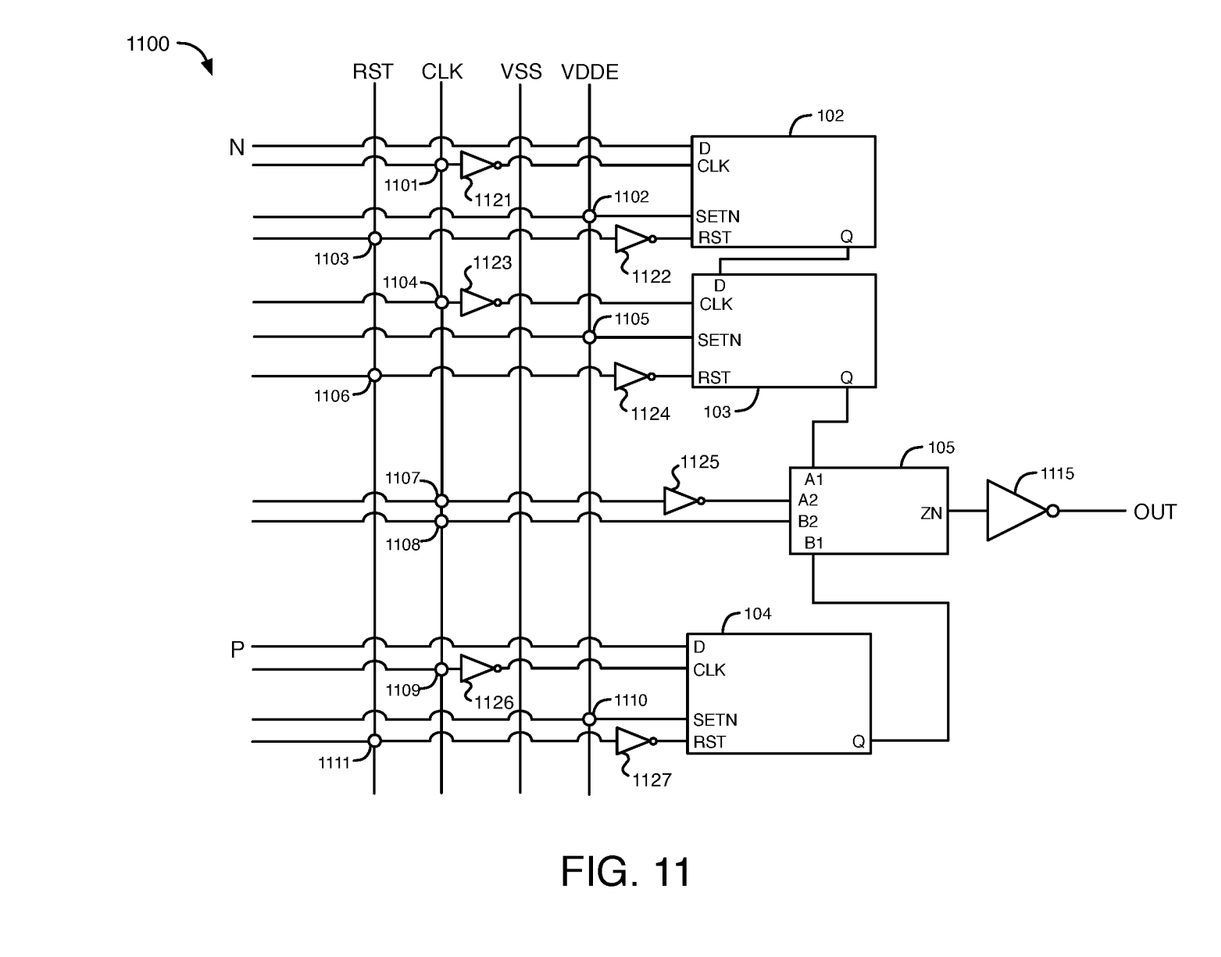
FIG. 11 illustrates an example of the clock macro circuit of FIG. 1 configured as a clock shaper circuit, according to another embodiment.

FIG. 11 illustrates an example of the clock macro circuit 100 of FIG. 1 configured as a clock shaper circuit 1100, according to an embodiment. Clock macro circuit 100 may be configured to implement the clock shaper circuit 1100 of FIG. 11, for example, by programming one or more via masks during fabrication of the ASIC containing clock macro circuit 100. Clock shaper circuit 1100 receives input signals N, P, RST, CLK, VSS, and VDDE from the corresponding inputs shown in FIG. 1. Vias 1101-1111 are a subset of the programmable vias 110 that have been filled with conductive material during fabrication of the ASIC to couple wires in the first metal layer N to corresponding wires in the second metal layer N+1 to create the connections between the inputs providing signals N, P, RST, CLK, VSS, and VDDE, circuits 102-105, and inverter circuits 1121-1127 shown in FIG. 11. The reset signal RST is also provided through one of vias 50.

In clock shaper circuit 1100, inverter circuits 1121-1127 may be the inverter circuits 401-402 in clock inversion circuit 101. Inverter circuits 1121, 1123, 1125, and 1126 provide inverted versions of the clock signal CLK to inputs of latch 102, latch 103, multiplexer 105, and latch 104, respectively. Inverter circuits 1122, 1124, and 1127 provide inverted versions of reset signal RST to the RST inputs of latch circuits 102, 103, and 104, respectively. Clock signal CLK is also provided to the B2 input of multiplexer 105 through via 1108. Input signals N and P are provided to the D inputs of latches 102 and 104, respectively. Signal VDDE is provided to the SETN inputs of latches 102, 103, and 104. Inverter circuit 1115 inverts the output signal of the multiplexer circuit 105 at output ZN to generate the output signal OUT of circuit 1100.

The input signal N controls the output signal OUT of the clock shaper circuit 1100 when the clock signal CLK is in a logical low state. When the clock signal CLK is in a logical low state (i.e., CLK=0), then the output signal OUT equals the logical state of input signal N (i.e., OUT=N). Input signal P controls the output signal OUT of the clock shaper circuit 1100 when the clock signal CLK is in a logical high state. When the clock signal CLK is in a logical high state (i.e., CLK=1), then the output signal OUT equals the logical state of input signal P (i.e., OUT=P). A logical low state in the RST signal resets the flip-flop formed by latches 102-103 and latch 104 through inverters 1122, 1124, and 1127. When the reset signal RST is in a logical low state, the output signal OUT is in a logical low state (OUT=0).

Clock macro circuit 100 of FIG. 1 can be configured as one of several types of clock circuits during fabrication of the ASIC by selectively making the programmable vias 50, 110, and 120 conductive or non-conductive. For example, clock macro circuit 100 may be configured as a clock multiplexer circuit (FIG. 6), a clock gate circuit (FIG. 7), a clock buffer circuit that generates an inverted output (FIG. 9), a clock shaper circuit (FIG. 11) that can be used to shape the waveform of a clock signal, a non-inverting clock buffer circuit, etc. Table 1 below provides further details of examples of selected configurations of the clock macro circuit 100 of FIG. 1.

TABLE 1

Clock macro circuit 100 configurations power-off configuration
clock buffer with non-inverted output
clock buffer with inverted output
clock buffer with inverted output and RST reset to 0
clock buffer with inverted output and RST reset to 1
clock buffer with non-inverted output and RST reset to 0
clock buffer with non-inverted output and RST reset to 1
clock buffer with inverted output, SE, TMODE, (0 output on high SE)
clock shaper with P and RST inputs
clock shaper for inverted clock signal with P and RST inputs
clock shaper with EN from N input port passing through flip-flop 102/103
clock shaper for inverted clock signal with EN input
clock gate with EN and RST inputs
clock gate with EN and RST inputs with inverted output
clock gate with EN input, EN goes to D input of latch 104
clock gate with EN and RST inputs, EN goes to D input of latch 104
clock shaper with P, N, and RST inputs
clock shaper for inverted clock signal with P, N, and RST inputs
clock multiplexer with 2 input clock signals (CLKA and CLKB) with latch ENABLE (i.e., the P input of clock macro circuit 100 coupled to the D input of latch 104)
clock multiplexer with 2 input clock signals (CLKA and CLKB) without latch ENABLE
clock multiplexer with 2 input clock signals (CLKA and CLKB) with latch ENABLE (i.e., the P input of clock macro circuit 100 coupled to the D input of latch 104) and RST or RSTN input coupled to the RST inputs of latches 102-104

The following examples pertain to further embodiments. Example 1 is an integrated circuit comprising a clock macro circuit, wherein the clock macro circuit comprises: first, second, and third latch circuits, wherein the first latch circuit is coupled to the second latch circuit; a multiplexer circuit coupled to the second and third latch circuits; and programmable vias that are programmed during fabrication of the integrated circuit to couple inputs of the clock macro circuit to the first latch circuit, the second latch circuit, the third latch circuit, and the multiplexer circuit, wherein the programmable vias are programmed to cause the clock macro circuit to function as a selected type of clock circuit.

In Example 2, the integrated circuit of Example 1 may optionally include, wherein the programmable vias are programmed to cause the clock macro circuit to function as one of a clock buffer circuit or a clock gate circuit.

In Example 3, the integrated circuit of Example 1 may optionally include, wherein the programmable vias are programmed to cause the clock macro circuit to function as a type of clock multiplexer circuit.

In Example 4, the integrated circuit of Example 1 may optionally include, wherein the programmable vias are programmed to cause the clock macro circuit to function as a clock shaper circuit.

In Example 5, the integrated circuit of any one of Examples 1~4 may optionally further comprise: an inversion circuit, wherein a subset of the programmable vias are programmed to couple the inversion circuit between at least one of the inputs of the clock macro circuit and an input of at least one of the first latch circuit, the second latch circuit, the third latch circuit, or the multiplexer circuit.

In Example 6, the integrated circuit of any one of Examples 1-5 may optionally include, wherein an output of the first latch circuit is coupled to an input of the second latch circuit, wherein outputs of the second and third latch circuits are coupled to first inputs of the multiplexer circuit, and wherein second inputs of the multiplexer circuit are coupled to two of the programmable vias.

In Example 7, the integrated circuit of any one of Examples 1-2 may optionally further comprise: a global clock network that distributes a clock signal in the integrated circuit, wherein a first instance of the clock macro circuit is configured as a clock gate circuit or as a clock buffer circuit that receives the clock signal from the global clock network; and a first local clock network that provides the clock signal from the first instance of the clock macro circuit to first circuits in the integrated circuit that are clocked by positive edges of the clock signal.

In Example 8, the integrated circuit of Example 7 may optionally further comprise: a second instance of the clock macro circuit configured as a clock buffer circuit that receives the clock signal from the global clock network and that generates an inverted clock signal; and a second local clock network that provides the inverted clock signal from the second instance of the clock macro circuit to second circuits in the integrated circuit that are clocked by negative edges of the clock signal.

In Example 9, the integrated circuit of any one of Examples 1-8 may optionally further comprise: an inversion circuit; and additional programmable vias that are programmed during fabrication of the integrated circuit to couple the inversion circuit between an output of the multiplexer circuit and an output of the clock macro circuit.

In Example 10, the integrated circuit of any one of Examples 1~4 may optionally include, wherein a first instance of the clock macro circuit is configured as one of a clock buffer circuit or a clock gate circuit, and wherein the integrated circuit further comprises a second instance of the clock macro circuit configured as one of a clock multiplexer circuit or a clock shaper circuit.

Example 11 is a method for fabricating a clock macro circuit in an integrated circuit, wherein the method comprises: programming first programmable vias during fabrication of the integrated circuit to couple first inputs of the clock macro circuit to a first latch circuit; programming second programmable vias during fabrication of the integrated circuit to couple second inputs of the clock macro circuit to a second latch circuit, wherein the first latch circuit is coupled to the second latch circuit; programming third programmable vias during fabrication of the integrated circuit to couple third inputs of the clock macro circuit to a multiplexer circuit; and programming fourth programmable vias during fabrication of the integrated circuit to couple fourth inputs of the clock macro circuit to a third latch circuit, wherein the multiplexer circuit is coupled to the second and third latch circuits, and wherein programming the first, second, third, and fourth programmable vias causes the clock macro circuit to function as one type of multiple types of clock circuits.

In Example 12, the method of Example 11 may optionally include, wherein programming the first, second, third, and fourth programmable vias comprises programming the clock macro circuit to function as one of a clock buffer circuit, a clock gate circuit, a clock multiplexer circuit, or a clock shaper circuit.

In Example 13, the method of any one of Examples 11-12 may optionally further comprise: programming a fifth programmable via during fabrication of the integrated circuit to couple a fifth input of the clock macro circuit to an inversion circuit; and programming a sixth programmable via during fabrication of the integrated circuit to couple an output of the inversion circuit to an input of at least one of the first latch circuit, the second latch circuit, the third latch circuit, or the multiplexer circuit.

In Example 14, the method of any one of Examples 11-13 may optionally further comprise: providing a global clock network coupled to distribute a clock signal in the integrated circuit, wherein programming the first, second, third, and fourth programmable vias comprises configuring a first instance of the clock macro circuit as a clock gate circuit or as a clock buffer circuit that is coupled to receive the clock signal from the global clock network; and providing a first local clock network that is coupled to provide the clock signal from the first instance of the clock macro circuit to first circuits in the integrated circuit that are clocked by positive edges of the clock signal.

In Example 15, the method of Example 14 may further comprise: configuring a second instance of the clock macro circuit as a clock buffer circuit that receives the clock signal from the global clock network and that generates an inverted clock signal; and providing a second local clock network that is coupled to provide the inverted clock signal from the second instance of the clock macro circuit to second circuits in the integrated circuit that are clocked by negative edges of the clock signal.

In Example 16, the method of any one of Examples 11-15 may optionally include, wherein an output of the first latch circuit is coupled to an input of the second latch circuit, and wherein outputs of the second and third latch circuits are coupled to inputs of the multiplexer circuit.

Example 17 is a clock macro circuit comprising: a first latch circuit coupled to first inputs of the clock macro circuit through first programmable vias that are programmed during fabrication of the clock macro circuit; a second latch circuit coupled to second inputs of the clock macro circuit through second programmable vias that are programmed during fabrication of the clock macro circuit, wherein the first latch circuit is coupled to the second latch circuit; a third latch circuit coupled to third inputs of the clock macro circuit through third programmable vias that are programmed during fabrication of the clock macro circuit; and a multiplexer circuit coupled to fourth inputs of the clock macro circuit through fourth programmable vias that are programmed during fabrication of the clock macro circuit, wherein the multiplexer circuit is coupled to the second and third latch circuits, and wherein programming the first, second, third, and fourth programmable vias causes the clock macro circuit to function as a selected type of clock circuit.

In Example 18, the clock macro circuit of Example 17 may optionally include, wherein the first, second, third, and fourth programmable vias are programmed to cause the clock macro circuit to function as one of a clock buffer circuit, a clock multiplexer circuit, a clock shaper circuit, or a clock gate circuit.

In Example 19, the clock macro circuit of any one of Examples 17-18 may optionally further comprise: an inversion circuit, wherein fifth programmable vias are programmed to couple the inversion circuit between a fifth input of the clock macro circuit and an input of at least one of the first latch circuit, the second latch circuit, the third latch circuit, or the multiplexer circuit.

In Example 20, the clock macro circuit of any one of Examples 17-19 may optionally include, wherein the clock macro circuit is configured as a clock buffer circuit that receives a clock signal from a clock network and that generates an inverted clock signal in response to the clock signal, and wherein the inverted clock signal is provided to circuits that are clocked by negative edges of the clock signal.

The foregoing description of the exemplary embodiments has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings, without departing from the scope of the present embodiments.

What is claimed is:

1. An integrated circuit comprising a clock macro circuit, wherein the clock macro circuit comprises:
   first, second, and third latch circuits, wherein the first latch circuit is coupled to the second latch circuit;
   a multiplexer circuit coupled to the second and third latch circuits; and
   programmable vias that are programmed during fabrication of the integrated circuit to couple inputs of the clock macro circuit to the first latch circuit, the second latch circuit, the third latch circuit, and the multiplexer circuit, wherein the programmable vias are programmed to cause the clock macro circuit to function as a selected type of clock circuit.

2. The integrated circuit of claim 1, wherein the programmable vias are programmed to cause the clock macro circuit to function as one of a clock buffer circuit or a clock gate circuit.

3. The integrated circuit of claim 1, wherein the programmable vias are programmed to cause the clock macro circuit to function as a type of clock multiplexer circuit.

4. The integrated circuit of claim 1, wherein the programmable vias are programmed to cause the clock macro circuit to function as a clock shaper circuit.

5. The integrated circuit of claim 1 further comprising:
   an inversion circuit, wherein a subset of the programmable vias are programmed to couple the inversion circuit between at least one of the inputs of the clock macro circuit and an input of at least one of the first latch circuit, the second latch circuit, the third latch circuit, or the multiplexer circuit.

6. The integrated circuit of claim 1, wherein an output of the first latch circuit is coupled to an input of the second latch circuit, wherein outputs of the second and third latch circuits are coupled to first inputs of the multiplexer circuit, and wherein second inputs of the multiplexer circuit are coupled to two of the programmable vias.

7. The integrated circuit of claim 1 further comprising:
   a global clock network that distributes a clock signal in the integrated circuit, wherein a first instance of the clock macro circuit is configured as a clock gate circuit or as a clock buffer circuit that receives the clock signal from the global clock network; and
   a first local clock network that provides the clock signal from the first instance of the clock macro circuit to first circuits in the integrated circuit that are clocked by positive edges of the clock signal.

8. The integrated circuit of claim 7 further comprising:
   a second instance of the clock macro circuit configured as a clock buffer circuit that receives the clock signal from the global clock network and that generates an inverted clock signal; and
   a second local clock network that provides the inverted clock signal from the second instance of the clock macro circuit to second circuits in the integrated circuit that are clocked by negative edges of the clock signal.

9. The integrated circuit of claim 1 further comprising:
an inversion circuit; and
additional programmable vias that are programmed during fabrication of the integrated circuit to couple the inversion circuit between an output of the multiplexer circuit and an output of the clock macro circuit.

10. The integrated circuit of claim 1, wherein a first instance of the clock macro circuit is configured as one of a clock buffer circuit or a clock gate circuit, and wherein the integrated circuit further comprises a second instance of the clock macro circuit configured as one of a clock multiplexer circuit or a clock shaper circuit.

11. A method for fabricating a clock macro circuit in an integrated circuit, wherein the method comprises:
programming first programmable vias during fabrication of the integrated circuit to couple first inputs of the clock macro circuit to a first latch circuit;
programming second programmable vias during fabrication of the integrated circuit to couple second inputs of the clock macro circuit to a second latch circuit, wherein the first latch circuit is coupled to the second latch circuit;
programming third programmable vias during fabrication of the integrated circuit to couple third inputs of the clock macro circuit to a multiplexer circuit; and
programming fourth programmable vias during fabrication of the integrated circuit to couple fourth inputs of the clock macro circuit to a third latch circuit, wherein the multiplexer circuit is coupled to the second and third latch circuits, and wherein programming the first, second, third, and fourth programmable vias causes the clock macro circuit to function as one type of multiple types of clock circuits.

12. The method of claim 11, wherein programming the first, second, third, and fourth programmable vias comprises programming the clock macro circuit to function as one of a clock buffer circuit, a clock gate circuit, a clock multiplexer circuit, or a clock shaper circuit.

13. The method of claim 11 further comprising:
programming a fifth programmable via during fabrication of the integrated circuit to couple a fifth input of the clock macro circuit to an inversion circuit; and
programming a sixth programmable via during fabrication of the integrated circuit to couple an output of the inversion circuit to an input of at least one of the first latch circuit, the second latch circuit, the third latch circuit, or the multiplexer circuit.

14. The method of claim 11 further comprising:
providing a global clock network coupled to distribute a clock signal in the integrated circuit, wherein programming the first, second, third, and fourth programmable vias comprises configuring a first instance of the clock macro circuit as a clock gate circuit or as a clock buffer circuit that is coupled to receive the clock signal from the global clock network; and
providing a first local clock network that is coupled to provide the clock signal from the first instance of the clock macro circuit to first circuits in the integrated circuit that are clocked by positive edges of the clock signal.

15. The method of claim 14 further comprising:
configuring a second instance of the clock macro circuit as a clock buffer circuit that receives the clock signal from the global clock network and that generates an inverted clock signal; and
providing a second local clock network that is coupled to provide the inverted clock signal from the second instance of the clock macro circuit to second circuits in the integrated circuit that are clocked by negative edges of the clock signal.

16. The method of claim 11, wherein an output of the first latch circuit is coupled to an input of the second latch circuit, and wherein outputs of the second and third latch circuits are coupled to inputs of the multiplexer circuit.

17. A clock macro circuit comprising:
a first latch circuit coupled to first inputs of the clock macro circuit through first programmable vias that are programmed during fabrication of the clock macro circuit;
a second latch circuit coupled to second inputs of the clock macro circuit through second programmable vias that are programmed during fabrication of the clock macro circuit, wherein the first latch circuit is coupled to the second latch circuit;
a third latch circuit coupled to third inputs of the clock macro circuit through third programmable vias that are programmed during fabrication of the clock macro circuit; and
a multiplexer circuit coupled to fourth inputs of the clock macro circuit through fourth programmable vias that are programmed during fabrication of the clock macro circuit, wherein the multiplexer circuit is coupled to the second and third latch circuits, and wherein programming the first, second, third, and fourth programmable vias causes the clock macro circuit to function as a selected type of clock circuit.

18. The clock macro circuit of claim 17, wherein the first, second, third, and fourth programmable vias are programmed to cause the clock macro circuit to function as one of a clock buffer circuit, a clock multiplexer circuit, a clock shaper circuit, or a clock gate circuit.

19. The clock macro circuit of claim 17 further comprising:
an inversion circuit, wherein fifth programmable vias are programmed to couple the inversion circuit between a fifth input of the clock macro circuit and an input of at least one of the first latch circuit, the second latch circuit, the third latch circuit, or the multiplexer circuit.

20. The clock macro circuit of claim 17, wherein the clock macro circuit is configured as a clock buffer circuit that receives a clock signal from a clock network and that generates an inverted clock signal in response to the clock signal, and wherein the inverted clock signal is provided to circuits that are clocked by negative edges of the clock signal.

\* \* \* \* \*